(12) United States Patent
Scranton

(10) Patent No.: US 7,434,489 B1
(45) Date of Patent: Oct. 14, 2008

(54) BICYCLE DRIVE SYSTEM

(76) Inventor: Peter Scranton, 25187 Second St., Hayward, CA (US) 94541

( * ) Notice: Subject to any disclaimer, the term of this patent is extended or adjusted under 35 U.S.C. 154(b) by 740 days.

(21) Appl. No.: 11/003,890

(22) Filed: Dec. 3, 2004

(51) Int. Cl.
*F16H 3/22* (2006.01)
(52) U.S. Cl. .............................. 74/347; 74/351; 74/352; 74/416; 280/236; 280/238; 280/260
(58) Field of Classification Search ................... 74/347, 74/351, 352, 416; 280/236, 238, 260
See application file for complete search history.

(56) References Cited

U.S. PATENT DOCUMENTS

| | | | |
|---|---|---|---|
| 619,551 A | 2/1899 | Ferris | |
| 628,453 A * | 7/1899 | Delane | 280/238 |
| 671,826 A | 4/1901 | Johnston | |
| 704,094 A | 7/1902 | Pelton | |
| 715,404 A | 12/1902 | Markgraf | |
| 3,863,503 A | 2/1975 | Loeb et al. | 74/347 |
| 5,078,416 A | 1/1992 | Keyes | 280/260 |
| 5,228,354 A | 7/1993 | Oosterwal et al. | 74/347 |
| 5,251,504 A | 10/1993 | Summerville, Jr. et al. | 74/368 |
| 5,273,500 A | 12/1993 | Nagano | 475/312 |
| 5,342,075 A | 8/1994 | Williams | 280/236 |
| 5,496,049 A | 3/1996 | Escobedo | 280/238 |
| 5,622,081 A | 4/1997 | Clements | 74/351 |
| 5,865,062 A | 2/1999 | Lahat | 74/473.12 |
| 6,073,061 A | 6/2000 | Kimura | 701/1 |
| 6,755,431 B2 * | 6/2004 | Chang | 280/260 |
| 6,786,497 B1 * | 9/2004 | Olszewski | 280/260 |
| 2004/0083839 A1 * | 5/2004 | Hahn | 74/344 |

* cited by examiner

*Primary Examiner*—David D. Le
(74) *Attorney, Agent, or Firm*—Haverstock & Owens, LLP

(57) ABSTRACT

A bicycle drive system includes a front gear face, a rear gear face, a front guide assembly, a rear guide assembly, and a drive shaft coupled to a rear-suspension frame via a rear hub and a crank spindle. The bicycle drive system operates independently of the frame. Shifting from one gear to another is controlled by a shift controller. Each shift of the shift controller shifts both the front and rear guide assemblies at the same time. The shift controller is preferably coupled to the front and rear guide assemblies via a cable system.

32 Claims, 7 Drawing Sheets

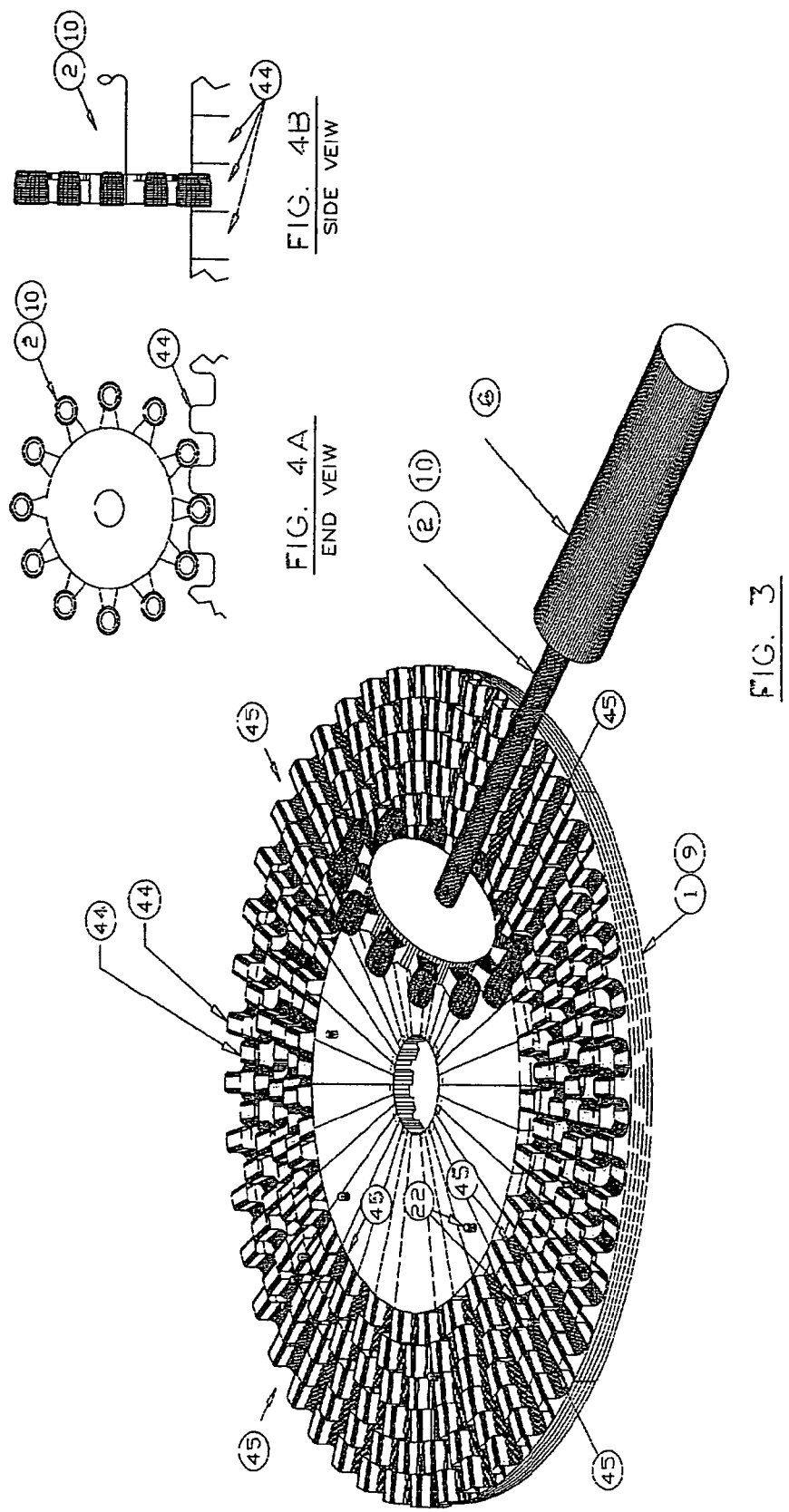

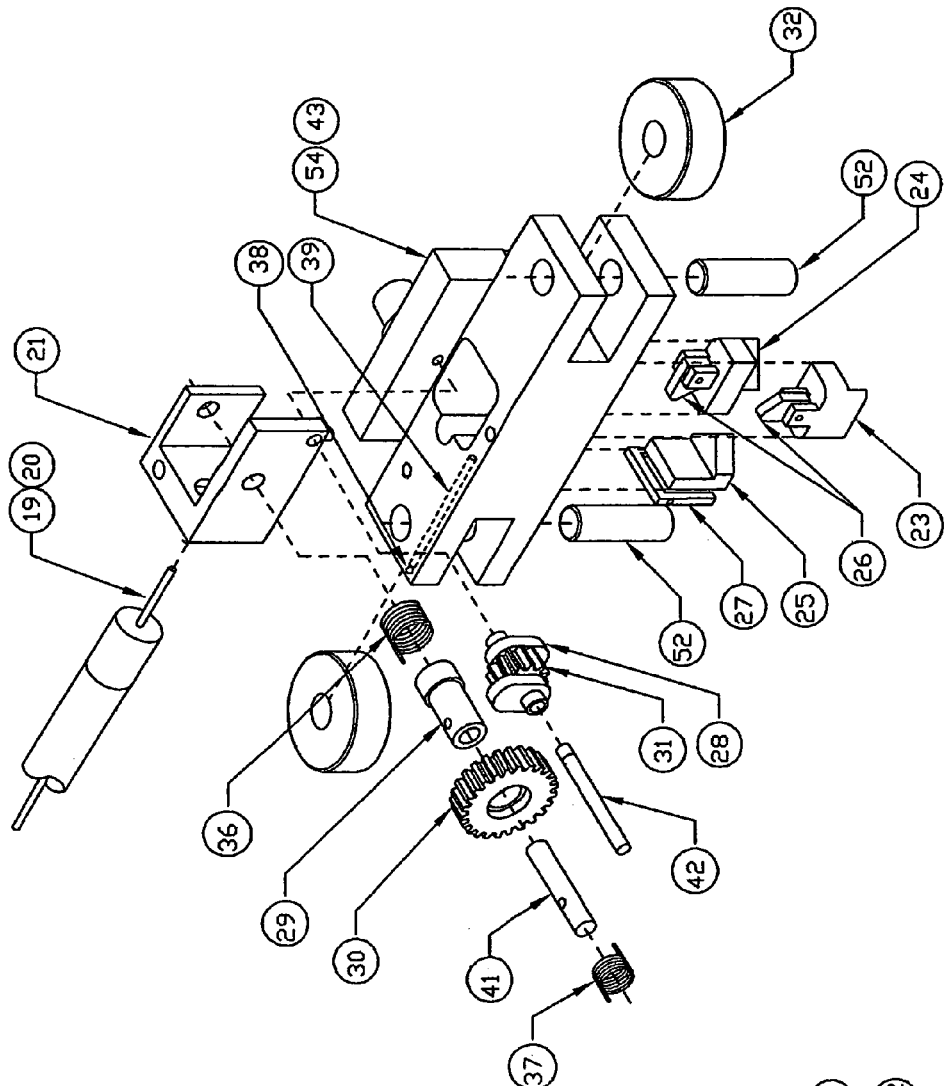
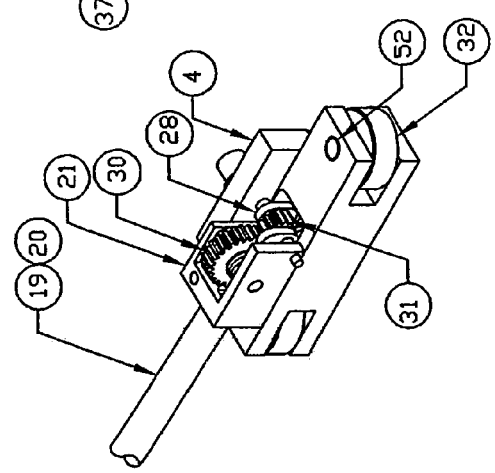
FIG. 5B
FIG. 5A

BICYCLE DRIVE SYSTEM

FIELD OF THE INVENTION

The present invention relates to bicycles. In particular, the present invention relates to a bicycle drive system.

BACKGROUND OF THE INVENTION

Conventional bicycle drive trains utilize a chain drive composed of a chain and sprockets to transfer motion from the pedals to the rear wheel of the bicycle. The disadvantages associated with chain drives are the exposure of the lubricated parts to contamination, causing excessive wear to interfacing parts and causing poor function, to complete failure, of operation. To prevent this requires frequent cleaning.

Another disadvantage is the exposure of the meshing point of the chain and sprocket, leaving it open to debris to be caught between the chain and sprocket rendering the system inoperable. The position of the rear derailleur makes it susceptible to strikes from obstacles occurred on roads or off-road trails. The chain can be thrown from the sprocket during operation on harsh road or trail conditions, again rendering it inoperable. The large front sprockets, in conjunction with the position and movement of the rear derailleur, spreads out the space required for such systems. This makes them cumbersome to enclose in order to shield from contamination. In prior art there are several shaft drives which have been proposed and are considered.

Drive shaft systems as described in U.S. Pat. Nos. 5,622,081, 5,342,075, and 5,228,354 require that pedaling stops in order to shift to a different gear ratio. In '081 and '354, the system is disengaged with the use of a clutching mechanism that disengages a pinion gear from a face gear. In '081, '354, and U.S. Pat. No. 3,863,503 there are two separate gear shift controls, one for the front and one for the rear, that shift these mechanisms. Each of '081, '075, '354, '503, and U.S. Pat. No. 5,251,504 require a bracket type of connection from the drive shaft system to the bicycle's frame, requiring every frame design to consider this requirement. None of these prior art drive shaft systems consider frames designed for rear suspension and the requirements therein.

It would be advantageous for a drive shaft system to include the ability to shift while pedaling the bicycle. It would also be advantageous to attach a drive shaft system independent of the bicycle frame. It would be advantageous to simplify the gear shift controls.

SUMMARY OF THE INVENTION

A multispeed, shaft driven bicycle drive and transmission system wherein the drive train includes a shiftable drive gear shaft connecting the pedal crank shaft and driving wheel by means of vertical face gear wheels mounted transversely thereon. Each of the face gear wheels includes a multitude of concentric series of gear teeth for providing different gear ratios. The geared drive shaft is moved from one series of gear teeth to another on one or both of the face gear wheels to change the gear ratio by means of two independently shifting, telescoping, concentric shafts. The shafts are connected by bearings mounted into brackets, which permits both longitudinal and rotational movement of the shafts. The brackets are in turn mounted at the pedal crank and the driving wheel utilizing bearings, giving the bicycle drive system the ability to be compliant to bicycle frames having rear suspension or "float". Guide shift assemblies connected to ends of the shafts and mounted slidably in the brackets contain wedge guides. When shifted into place, the wedge guides come in contact with one of a plurality of dowel pins protruding from the face gear wheels as the face gear wheels rotate, thereby pushing or pulling the geared drive shaft to a selected adjacent set of gear teeth. Wedge guide contact with the dowel pins occurs strategically when the adjacent gear teeth series have tooth alignment.

BRIEF DESCRIPTION OF THE DRAWINGS

FIG. 3 illustrates a perspective view of a face gear interacting with a shaft/pinion gear.

FIG. 4A illustrates a front view of a gear portion of the shaft/pinion gear coupled to a single face gear ring.

FIG. 4B illustrates a side view of the shaft/pinion gear coupled to one of the face gear rings.

FIG. 5A illustrates a perspective view of the guide assembly.

FIG. 5B illustrates an exploded view of the guide assembly.

DETAILED DESCRIPTION OF THE PRESENT INVENTION

Embodiments of the present invention are directed to a bicycle drive system. The bicycle drive system includes a front gear face, a rear gear face, a front guide assembly, a rear guide assembly, and a drive shaft. The bicycle drive system is preferably coupled to a rear-suspension frame via a rear hub and a crank spindle. The rear hub preferably includes a conventional freewheel mechanism and the crank spindle is positioned through a frame spindle hole in the frame such that the bicycle drive system operates independently of the frame. This enables the bicycle drive system to operate with independent frame designs.

The bicycle drive system includes a multitude of gear ratios, each gear ratio corresponding to a gear. Shifting from one gear to another is controlled by a shift controller which is preferably coupled to the bicycle handlebars. In the preferred embodiment, the bicycle drive system includes twelve consecutive gear ratios controlled by a single shift controller. Alternatively, the bicycle drive system can include more or less than twelve gear ratios. Use of the single shift controller simplifies the shifting operation. Each shift of the shift controller shifts both the front and rear guide assemblies at the same time. The shift controller is preferably coupled to the front and rear guide assemblies via a cable system.

Figure 1:
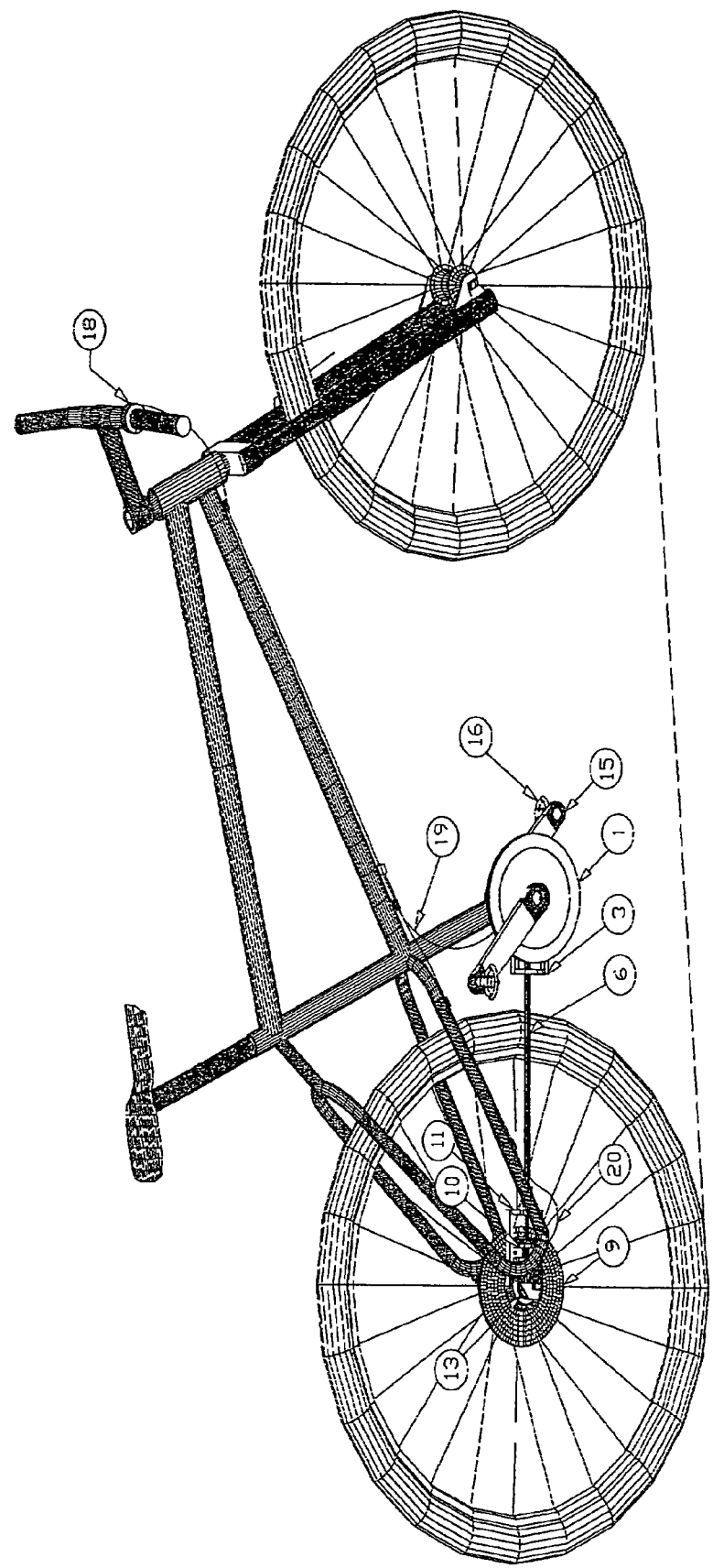
FIG. 1 illustrates an exemplary bicycle including the bicycle drive system of the present invention.
Figure 2:
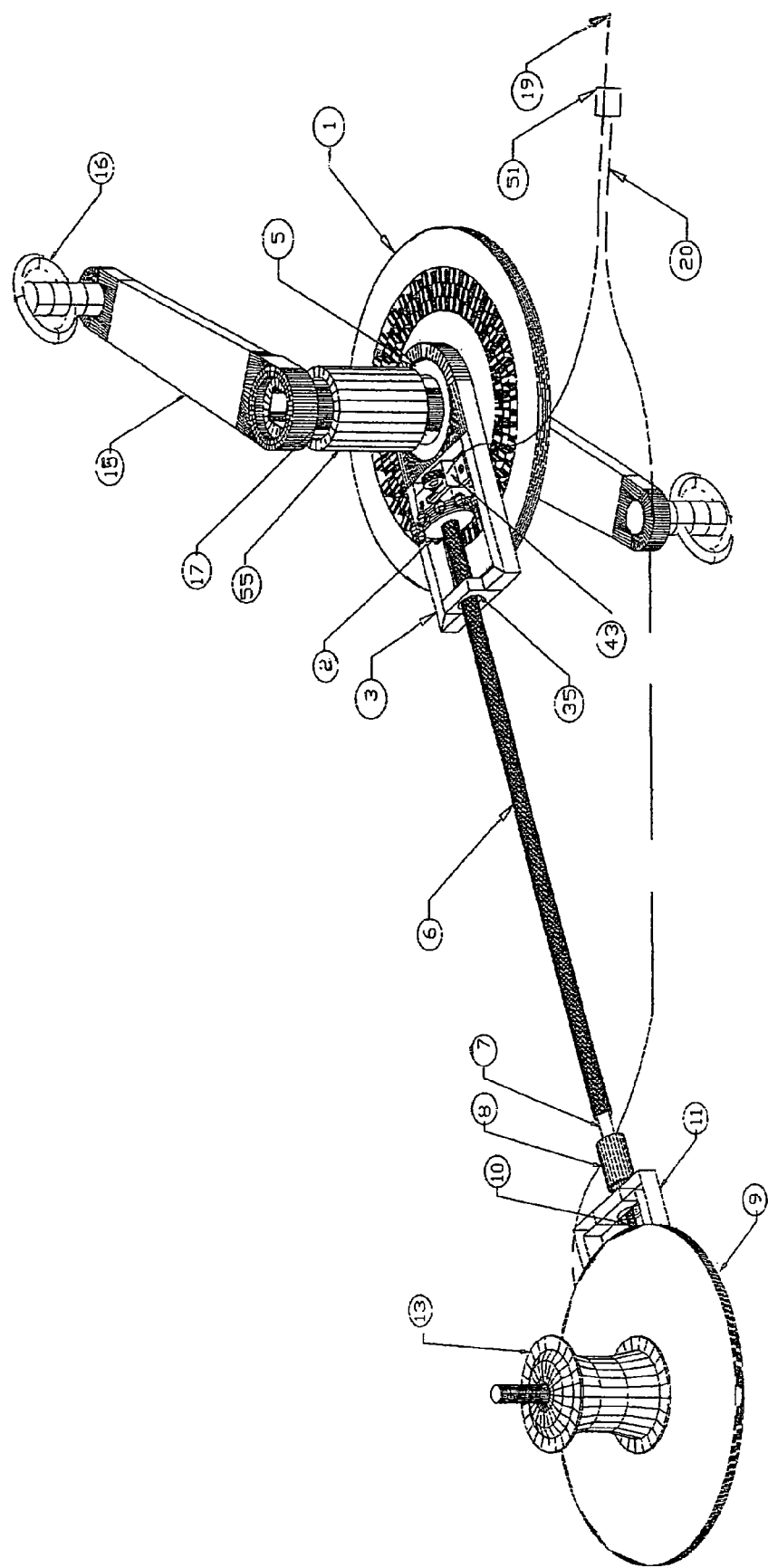
FIG. 2 illustrates the preferred bicycle drive system of the present invention.
Figure 6:
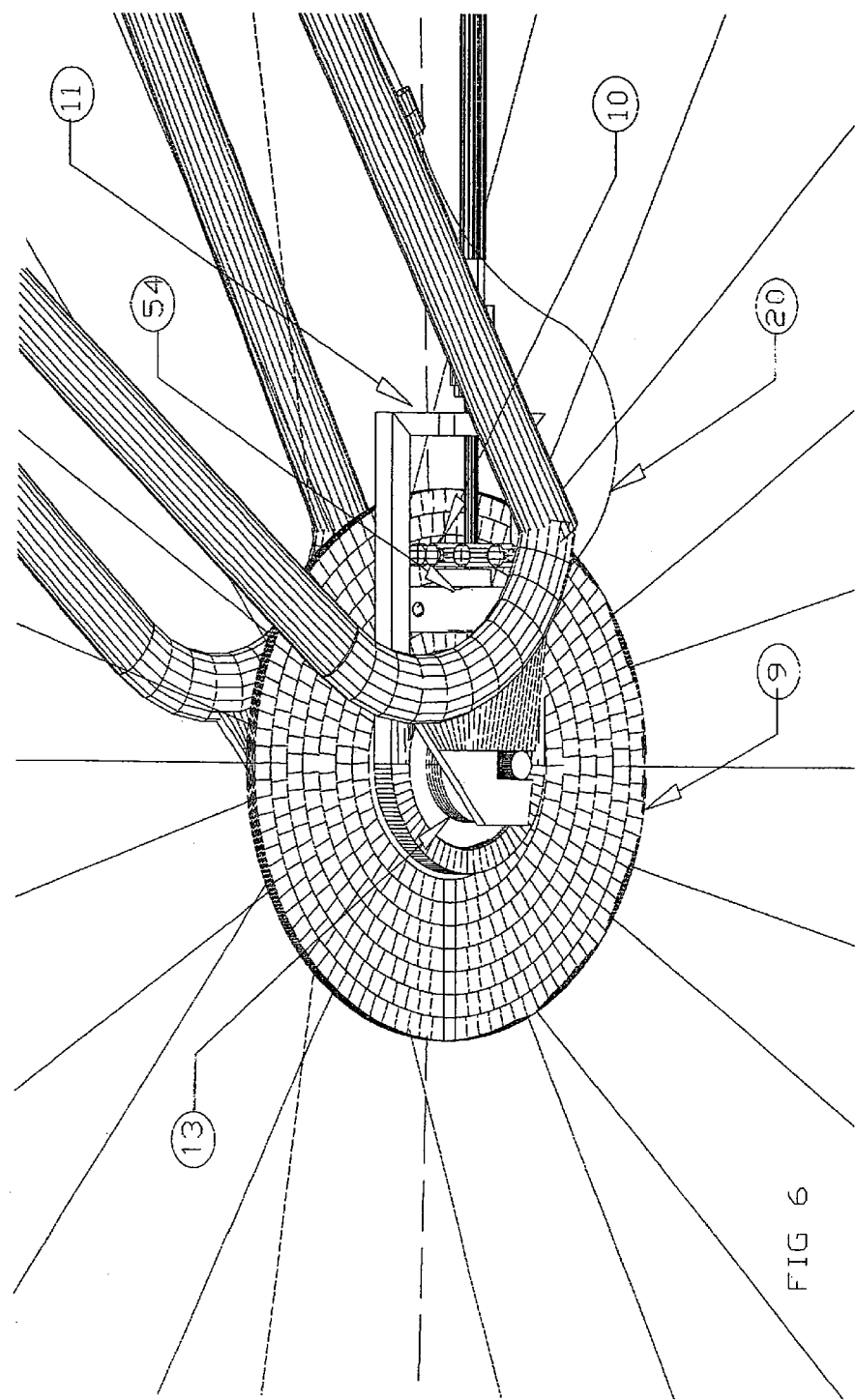
FIG. 6 illustrates a perspective view of the rear shaft/pinion gear, the rear face gear, and the rear hub coupled to the bicycle frame.

Configuration and operation of the bicycle drive system is described below in relation to FIGS. 1-7. Similar components retain the same reference numeral throughout the figures. FIG. 1 illustrates an exemplary bicycle including the bicycle drive system of the present invention. The bicycle includes a shift controller 18 coupled to the bicycle drive system via front cable 19 and rear cable 20. The bicycle drive system includes pedals 16, crank arms 15, a front face gear 1, a rear face gear 9, a front slider frame 3, a rear slider frame 11, and a drive shaft 6. FIG. 2 illustrates the preferred bicycle drive system in greater detail. The bicycle drive system's power is typical of conventional bicycles in that power starting from human leg effort applied to pedals 16 is transferred to crank arms 15. The crank arms 15 are coupled to a crank spindle 17, which is mounted to a bottom bracket 55 of a bicycle frame. The front gear face 1 is attached to one of the crank arms 15. A front shaft/pinion gear 2 engages the front gear face 1, turning the drive shaft 6, a telescoping link 7,8, and a rear shaft/pinion gear 10 (FIG. 1). The telescoping link 7,8 comprises a telescoping shaft 7 and a telescoping sleeve 8. The rear shaft/pinion gear 10 engages the rear face gear 9. The rear face gear 9 is attached to a rear hub 13. The rear hub 13 preferably includes a conventional freewheel mechanism that allows a rider to coast when they stop pedaling. FIG. 6 illustrates a perspective view of the rear shaft/pinion gear 10, the rear face gear 9, and the rear hub 13 coupled to the bicycle frame.

The front face gear 1 is attached to the splined crank arm 15, thereby holding the front face gear 1 in place. A collar 5 (FIG. 2 and FIG. 7B) is preferably press fit into a sliding frame bearing 33 (FIG. 7B), and the sliding frame bearing 33 is preferably press fit into the front slider frame 3. The rear face gear 9 is splined in the center and attaches to a splined freewheel of the rear hub 13 using spacers and a spin-on nut, as shown in FIG. 6.

Referring again to FIG. 2, a drive shaft bearing 35 is preferably press fit into the front slider frame 3. A shaft portion of the front shaft/pinion gear 2 runs through the drive shaft bearing 35 and attaches to the drive shaft 6. A slider shaft bearing 34 (FIG. 7A) is preferably press fit into the back of the front shaft/pinion gear 2 to secure the front shaft/pinion gear 2 to a front guide assembly 43. Similarly, a rear drive shaft bearing is preferably press fit into the rear slider frame 11. A shaft portion of the rear shaft/pinion gear 10 runs through the rear drive shaft bearing and attaches to the telescoping sleeve 8. The telescoping sleeve 8 is coupled to the telescoping shaft 7, which in turn is coupled to the drive shaft 6. A rear slider shaft bearing is preferably press fit into the back of the rear shaft/pinion gear 10 to secure the rear shaft/pinion gear 10 to a rear guide assembly 54 (FIG. 6).

FIG. 3 illustrates a perspective view of a face gear interacting with a shaft/pinion gear. The face gear illustrated in FIG. 3 is representative of either the front face gear 1 or the rear face gear 9. Similarly, the shift/pinion gear is representative of either the front shaft/pinion gear 2 or the rear shaft/pinion gear 10. The face gear 1,9 includes face gear rings 44 and a multitude of dowel pins 22. Each of the dowel pins 22 extends from a surface of the gear face 1,9 and is used to engage wedge guides within the guide assembly 43, 54 to shift gears. The dowel pins 22 are positioned at strategic points on the gear face 1, 9, as described in greater detail below.

The front face gear 1 includes a multitude of concentric gear teeth rings 44, each gear teeth ring 44 having a series of gear teeth. In the preferred embodiment, the front gear face 1 includes 6 gear teeth rings 44. Alternatively, each front face gear 1 includes more or less than 6 gear teeth rings 44. In the preferred embodiment, each of the gear teeth rings 44 are an integrated single piece that forms the front face gear 1. Alternatively, each of the gear teeth rings 44 is an individual component coupled together to form the front face gear 1. The rear face gear 9 is formed in a similar fashion as that of front face gear 1.

FIG. 4A illustrates a front view of a gear portion of the shaft/pinion gear 2, 10 coupled to a single face gear ring 44. In the preferred embodiment, the face gear ring 44 includes a face gear tooth form that is substantially a zero pressure angle. Alternatively, the face gear tooth form can be configured according to other pressure angles. FIG. 4B illustrates a side view of the shaft/pinion gear 2, 10, coupled to one of the face gear rings 44.

An advantage of the bicycle drive system is that the pedaling action does not need to stop to change gear ratios, in other words no clutch is required. Gears are changed during normal operating rotation of the face gear. The gear change action occurs by having dowel pins 22 protruding out from each face gear 1, 9 at strategic points. As each face gear 1, 9 rotates due to pedaling action, the dowel pins 22 also rotate as being fixed to the face gears 1, 9. During a gear shift, a rotating dowel pin 22 intercepts a combination of wedge guides within either the front guide assembly 43 or the rear guide assembly 54. In the case where a gear shift occurs on the front gear face 1, the dowel pins 22 are positioned such that a dowel pin 22 contacts the wedge guides as the front shaft/pinion gear 2 is engaged with the face gear 1 at a "Match Up Point". This forces the movement of the guide assembly 43, front shaft/pinion gear 2, and drive shaft 6 either radially inward or radially outward on the face gear 1, from one face gear ring 44 to another adjacent face gear ring 44 at "match up points". Match up points, as shown in FIG. 3, are the alignments of continual gear tooth faces. Such alignments occur when select gear teeth in one face gear ring 44 align radially to the gear teeth in an adjacent face gear ring 44, illustrated as aligned adjacent teeth 45. The front shaft/pinion gear 2 and drive shaft 6 move on their rotating axis from one gear to another by sliding across this continual gear tooth face created by the aligned adjacent teeth 45. Several aligned adjacent teeth 45 exist between each of the face gear rings 44 and the system actuates shifts only at these points. Preferably, a dowel pin 22 is positioned according to each aligned adjacent teeth 45. This creates a smooth, seamless transition to new gear ratios. The telescoping link 7, 8 compensates for change in length of the drive shaft 6 between the front shaft/pinion gear 2 and the rear shaft/pinion gear 10 when a gear change occurs. A gear shift occurring on the rear face gear 9 occurs in a similar fashion as that described above in relation to a gear shift occurring on the front face gear 1.

FIG. 5A illustrates a perspective view of the guide assembly 43, 54. The guide assembly 43, 54 includes a slider 4, guide wheels 32, slider wheel axles 52, a cam shaft bracket 21, a spindle gear 30, a cam gear 31, and a camshaft 28. The front guide assembly 43 is coupled to the front cable 19, and the rear guide assembly 54 is coupled to the rear cable 20.

FIG. 5B illustrates an exploded view of the guide assembly 43, 54. In addition to the slider 4, guide wheels 32, slider wheel axles 52, the cam shaft bracket 21, the spindle gear 30, the cam gear 31, and the camshaft 28, the guide assembly 43, 54 includes a guide spindle 29, a return spring 37, a guide spindle spring 36, a cam shaft axle 42, a guide spindle axle 41 a trigger 27, a left wedge guide 23, a right wedge guide 24, a common wedge guide 25. Each of the left wedge guide 23 and the right wedge guide 24 include a cam follower 26. The slider 4 includes a lengthwise aperture, preferably positioned above the guide wheels 32, within which a ball bearing 38 and a ball bearing spring and rod 39 are configured to move back and forth. Each of the guide wheels 32 are coupled to the slider 4 via slider wheel axles 52. The cam gear 31 and the camshaft 28 are coupled to the cam shaft bracket 21 via the cam shaft axle 42. The spindle gear 30 is coupled to the cam shaft bracket via the return spring 37, the guide spindle axle 41, the guide spindle 29, and the guide spindle spring 36. The cam shaft bracket 21 is coupled to the slider 4 via the cam shaft axle 42. The cam shaft bracket 21 is preferably bolted to the slider 4. The cable 19, 20 is coupled to the guide spindle axle 41 and the guide spindle 29.

The front guide assembly 43 is aligned within the front slider frame 3. To properly position the front guide assembly 43 within the front slider frame 3 and to enable movement of the front guide assembly 43 radially inward and radially outward within the front slider frame 3, the front slider frame 3 includes grooves 53 (FIG. 7A) on the inner portion of the front slider frame 3. The guide wheels 32 attached to the slider 4, are positioned within grooves 53. The rear guide assembly 54 is configured within the rear slider frame 11 in a similar manner.

To shift the front shaft/pinion gear 2 from one face gear ring 44 to an adjacent face gear ring 44, in other words to shift gears, the front guide assembly 43 is actuated thereby moving either radially inward or radially outward in relation to the front face gear 1. Actuation of the guide assembly 43, 54 is described in detail below. Movement of the front guide assembly 43 is enabled by the guide wheels 32 moving within the grooves 53 of the front slider frame 3. Since the front guide assembly 43 is coupled to the front shaft/pinion gear 2, movement of the front guide assembly 43 also moves the front shaft/pinion gear 2 in the same direction as movement of the front guide assembly 43. Movement of the front shaft/pinion gear 2 occurs at one of the aligned adjacent teeth 45, thereby moving the front shaft/pinion gear 2 from one face gear ring 44 to an adjacent face gear ring 44. Shifting the rear shaft/pinion gear 10 from one face gear ring 44 to an adjacent face gear ring 44 is performed similarly to that described above in relation to shifting the front shaft/pinion gear 2.

The bicycle drive system preferably operates in a normal mode and a gear-shifting mode. In the normal mode, the bicycle drive system is set in a specific gear ratio, where the gear ratio remains constant. In this normal mode, both the left wedge guide 23, the right wedge guide 24, and the common wedge 25 remain in an up, or passive position, such that none of these wedges interacts with any of the dowel pins 22. In the gear-shifting mode, a gear ratio change is initiated using the shift controller 18 and as a result, one of either the front guide assembly 43 or the rear guide assembly 54 is moved corresponding to the changed gear ratio.

In operation, a user makes a gear change by shifting the shift controller 18. This in turn either shortens or lengthens the cable 19 leading to the front guide assembly 43. The front cable 19 is coupled to the cable junction 51, which in turn is coupled to the rear cable 20. Therefore, as the front cable 19 is either shortened or lengthened due to a gear shift, so too is the rear cable 20 either shortened or lengthened in conjunction with the front cable 19. In this manner, a position change of the shift controller 18 simultaneously actuates both the front guide assembly 43 and the rear guide assembly 54.

Within the preferred embodiment, each of the face gears 1 and 9 include 6 face gear rings 44, where each face gear ring 44 enables a specific gear ratio. Therefore, in the preferred embodiment, there are twelve gear ratios. Each of the twelve gear ratios corresponds to a position of the front shaft/pinion gear 2 within a specific one face gear ring 44 on the front face gear 1 in combination with a position of the rear shaft/pinion gear 10 within a specific one face gear ring 44 on the rear face gear 9. The twelve gear ratios are controlled by a single gear ratio controller, the shift controller 18. A position change of the shift controller 18, that is a gear shift made using the shift controller 18, actuates both the front guide assembly 43 and the rear guide assembly 54 at the same time. Shifting through all twelve gear ratios is accomplished using a gear shift sequence. To enable the gear shift sequence, during a gear shift each of the guide assemblies 43, 54 is enabled with an active phase and a passive phase that acts as a two-way ratchet mechanism, which includes an engaged, or locked, mode, and a non-engaged, or free-moving, mode. While the rear guide assembly 54 is in its passive phase, the front guide assembly 43 is in its active phase. While the rear guide assembly 54 is in its active phase, the front guide assembly 43 is in its passive phase.

For example, to increase one gear ratio, the front guide assembly 43 is actuated in its active phase and the rear guide assembly 54 is actuated in its passive phase. While in the active phase, the front guide assembly 43 is actuated into making a gear position change, that is the front shaft/pinion gear 2 is moved from one face gear ring 44 to an adjacent face gear ring 44 on the front face gear 1. However, since the rear guide assembly 54 is in its passive phase while the front guide assembly 43 is in its active phase, the rear shaft/pinion gear 10 does not move from its current face gear ring 44 on the rear face gear 9. To further the example, if the gear ratio is subsequently increased one additional gear ratio, then the front guide assembly 43 is actuated in its passive phase and the rear guide assembly 54 is actuated in its active phase. While in its passive phase, the front guide assembly 43 is not actuated to move, therefore the front shaft/pinion gear 2 maintains its position within the current face gear ring 44 of the front face gear 1. However, the rear guide assembly 54 is in its active phase which actuates the rear guide assembly 54 into making a gear position change, that is the rear shaft/pinion gear 10 is moved from one face gear ring 44 to an adjacent face gear ring 44 on the rear face gear 9.

Within both guide assemblies 43, 54, shortening or lengthening of the cable 19, rotates the guide spindle axle 41 which in turn rotates the spindle gear 30. Rotation of the spindle gear 30 rotates the cam gear 31, which in turn rotates the camshaft 28 about the camshaft axle 42. Each gear shift of the gear shift controller 18 rotates the camshaft 28 by 180 degrees. Since both front guide assembly 43 and rear guide assembly 54 are actuated with each gear shift, the camshaft 28 within each guide assembly 43, 54 is rotated 180 degrees for each gear shift. The direction that the camshaft 28 rotates depends on whether the gear is shifted up or down. For example, shifting the gear up one gear ratio can rotate the camshaft 28 counter-clockwise by 180 degrees, and shifting the gear down by one gear ratio can rotate the camshaft 28 clockwise by 180 degrees.

Rotation of the camshaft 28 initiates contact with the cam follower 26 on the left wedge guide 23 once every 360 degree rotation. Similarly, rotation of the camshaft 28 initiates contact with the cam follower 26 on the right wedge guide 24 once every 360 degree rotation. The cam followers 26 are configured such that when contacted in one direction, the cam follower 26 pivots, and when contacted in the opposite direction the cam follower 26 remains rigid. The cam follower 26 on the left wedge guide 23 is preferably configured such that as the camshaft 28 makes contact rotating clockwise, the cam follower 26 on the left wedge guide 23 remains rigid. In this case, force applied by the camshaft 28 on the rigid cam follower 26 forces the left wedge guide 23 coupled to the rigid cam follower 26 downward from an up, or passive, position towards the face gear 1,9. Downward movement of the left wedge guide 23 also forces downward the common wedge 25 and the trigger 27. The trigger 27 is spring loaded such that the common wedge 25 and the left wedge guide 23 are held in place at a down, or intercept, position. The intercept position is close enough to the face gear 1, 9 such that a dowel pin 22 extending from the face gear 1, 9 makes contact with the left wedge guide 23. As the face gear 1, 9 is rotated, the left wedge guide 23 intercepts a dowel pin 22 causing movement of the guide assembly 43, 54 and connected shaft/pinion gear 2, 10 radially inward to an adjacent face gear ring 44 at an aligned adjacent teeth 45 corresponding to the intercepted dowel pin 22, thus shifting to a new gear ratio. After the dowel pin 22 moves across the faces of the left wedge guide 23 and the common wedge 25, the dowel pin 22 engages the trigger 27. The trigger 27 is pushed back by the dowel pin 22 thereby releasing the left wedge guide 23 and the common wedge 25 into the up, or passive, position.

The cam follower 26 on the right wedge guide 24 is preferably configured such that as the camshaft 28 makes contact rotating clockwise, the cam follower 26 on the right wedge guide 23 pivots such that no downward force is applied to the right wedge guide 24. In this case, the right wedge guide 24 remains in the up, or passive, position. This is analogous to the non-engaged mode in a two-way ratchet. The passive position is the position maintained either when a gear shift is made and one of the guide assemblies 43, 54 is in the passive phase, or when no gear shift is made and the bicycle drive system is in a normal operating mode.

Figures 7A, 7B:
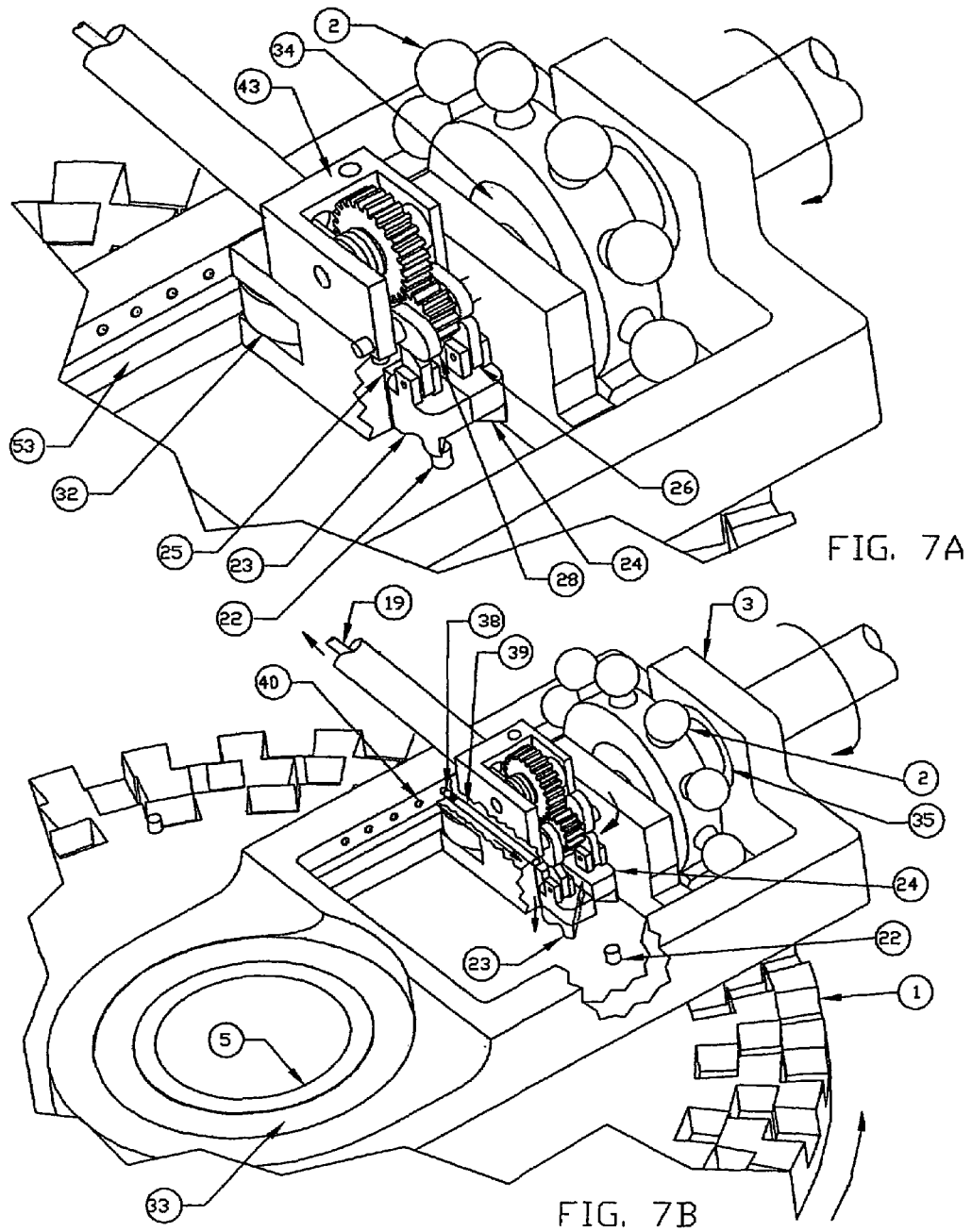
FIG. 7A illustrates the front shaft/pinion gear and an internal view of the front guide assembly, both within the front slider frame while both the left wedge guide and the right wedge guide are in the up, or passive, position.

FIG. 7A illustrates the front shaft/pinion gear 2 and an internal view of the front guide assembly 43, both within the front slider frame 3 while both the left wedge guide 23 and the right wedge guide 24 are in the up, or passive, position. This particular passive position corresponds to the bicycle drive system being in the normal operating mode in which no gear shift has been made. As can be seen in FIG. 7A, both the left wedge guide 23 and the right wedge guide 24 are in the up, or passive, position, and the dowel pin 22 passes underneath both wedge guides without interaction. When both the left wedge guide 23 and the right wedge guide 24 are in the up position, the common wedge 25 is also in the up position. While in the up position, the common wedge 25 forces the ball bearing 38 via the ball bearing spring and rod 39 into the indentation 40, thereby locking the front guide assembly 34 into place when no shifting is occurring.

FIG. 7B illustrates the front shaft/pinion gear 2 and an internal view of the front guide assembly 43, both within the front slider frame 3 where the left wedge guide 23 and the common wedge 25 (not shown in FIG. 7B) have been forced into the down, or intercept, position, and the right wedge guide 24 remains in the up, or passive, position. In the down position, the left wedge guide 23 is in a position to intercept the dowel pin 22 as the face gear 1, 9 rotates in the counterclockwise direction. When the common wedge 25 is forced into the down position, tension on the ball bearing spring and rod 39 is released and the ball bearing 38 slides out of the indentation 40. Once the ball bearing 38 is removed from the indentation 40, the front guide assembly 43 is no longer locked in placed and can be subsequently moved. After the gear shift is complete, the common wedge 25 is released back to the up position, thereby forcing the ball bearing 38 via the ball bearing spring and rod 39 back into the indentation 40.

Figure 7C:
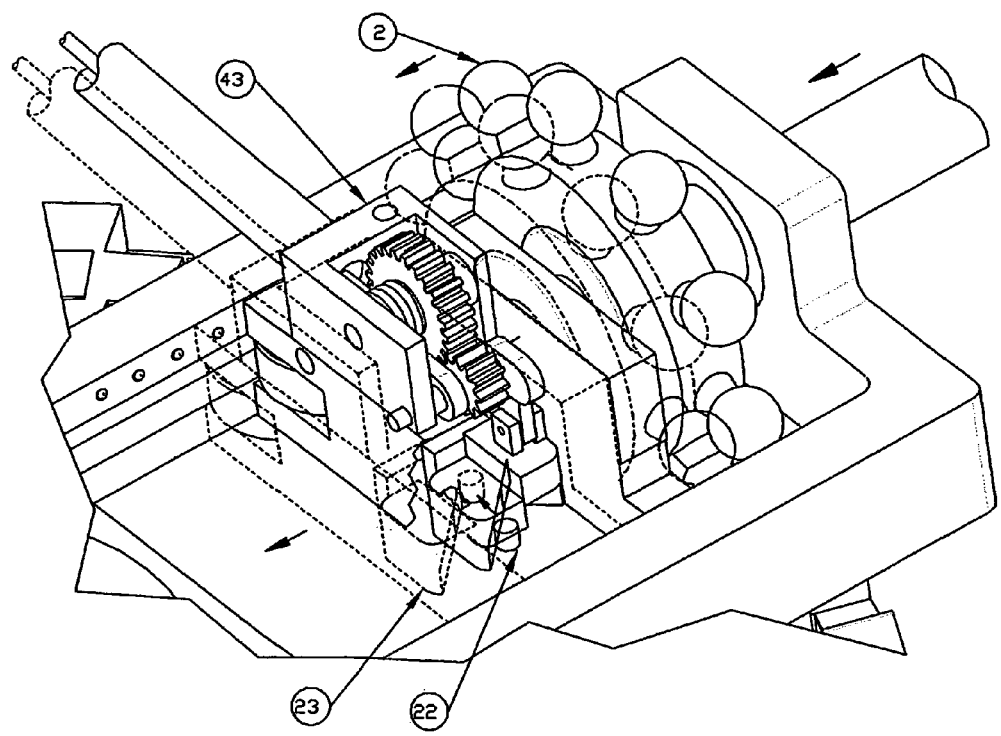
FIG. 7C illustrates movement of the front shaft/pinion gear and the front guide assembly from FIG. 7B as the left wedge guide intercepts the dowel pin.

FIG. 7C illustrates movement of the front shaft/pinion gear 2 and the front guide assembly 43 from FIG. 7B as the left wedge guide 23 intercepts the dowel pin 22. As the dowel pin 22 impacts the left wedge guide 23 and the front face gear 1 continues to rotate in the counterclockwise direction, the dowel pin 22 slides along the leading face of the left wedge guide 23 which forces the entire front guide assembly 43 (and the front shaft/pinion gear 2 coupled to the front guide assembly 43) radially inward toward the center of the front face gear 1.

Shifting a gear ratio in the opposite direction as that described above is preferably accomplished by rotating the camshaft 28 in the counterclockwise direction. When the camshaft 28 moves in the counterclockwise direction and makes contact with the cam follower 26 on the left wedge guide 23, the cam follower 26 rotates and no downward force is applied to the left wedge guide 23. In this case, the left wedge guide 23 remains in the up, or passive, position. When the camshaft 28 moves in the counterclockwise direction and makes contact with the cam follower 26 on the right wedge guide 24, the cam follower 26 remains rigid and downward force is applied on the right wedge guide 24. In this case the right wedge guide 24 is moved downward into the down, or intercept, position. Downward movement of the right wedge guide 24 also forces downward the common wedge 25 and the trigger 27. As the face gear 1, 9 is rotated, a dowel pin 22 intercepts the right wedge guide 24 causing movement of the guide assembly 43 and connected front shaft/pinion gear 2 radially outward to an adjacent face gear ring 44 at an aligned adjacent teeth 45 corresponding to the intercepted dowel pin 22, thus shifting to a new gear ratio. After the dowel pin 22 moves across the faces of the right wedge guide 24 and the common wedge 25, the dowel pin 22 engages the trigger 27. The trigger 27 is pushed back by the dowel pin 22 thereby releasing the right wedge guide 24 and the common wedge 25 into the up, or passive, position. Configuration, operation, and movement of the rear guide assembly 54 and rear shaft/pinion gear 10 relation to the rear face gear 9 is similar to that described in relation to FIGS. 7A-7C above.

For a given guide assembly 43, 54, the cam follower 26 on the left wedge guide 23 contacts the camshaft 28 once every 360 degree rotation of the camshaft 28. The cam follower 26 on the right wedge guide 24 contacts the camshaft 28 once every 360 degree rotation of the camshaft 28. The camshaft 28 is configured such that contact with the cam follower 26 on the left wedge guide 23 is 180 degrees apart from contact with the cam follower 26 on the right wedge guide 24. As discussed above, each cam follower 26 remains rigid when contacted from a first direction, but pivots when contacted from the opposite, or second, direction. Preferably, the cam follower 26 on the left wedge guide 23 is configured opposite that of the cam follower 26 on the right wedge guide 24. In this manner, as the camshaft 28 rotates in a first direction, for example clockwise, the cam follower 26 on the left wedge guide 23 remains rigid when contacted by the camshaft 28 and the cam follower 26 on the right wedge guide 24 pivots when contacted by the camshaft 28. As the camshaft 28 rotates in a second direction, for example counterclockwise, the cam follower 26 on the left wedge guide 23 pivots when contacted by the camshaft 28 and the cam follower 26 on the right wedge guide 24 remains rigid. Since each gear shift rotates the camshaft 28 by 180 degrees, the camshaft 28 makes contact with one rigid cam follower 26 for every two gear shifts. During a gear shift in which its camshaft 28 does not make contact with a rigid cam follower 26, the corresponding guide assembly 43, 54 is said to be in the passive phase.

One gear shift rotates both the camshaft 28 of the front guide assembly 43 and the camshaft 28 of the rear guide assembly 54 simultaneously by 180 degrees. The front guide assembly 43 and the rear guide assembly 54 are preferably configured such that as the camshaft 28 of the front guide assembly 43 contacts a rigid cam follower 26, thereby initiating a gear shift of the front gear assembly 43, the camshaft 28 of the rear guide assembly 54 contacts a non-rigid, or pivoting, cam follower 26 such that the rear guide assembly 54 remains in the passive phase. Similarly, the front guide assembly 43 and the rear guide assembly 54 are also preferably configured such that as the camshaft 28 of the rear guide assembly 54 contacts a rigid cam follower 26, thereby initiating a gear shift of the rear gear assembly 54, the camshaft 28 of the front guide assembly 43 contacts a non-rigid, or pivoting, cam follower 26 such that the front guide assembly 43 remains in the passive phase. In this manner, for each gear shift, one of the guide assemblies is shifting gears while the other guide assembly remains in the passive mode. As the gear ratio is sequentially increased, the front guide assembly 43 and the rear guide assembly 54 alternate shifting gears in ever increasing gear ratios. Similarly, as the gear ratio is sequentially decreased, the front guide assembly 43 and the rear guide assembly 54 alternate shifting gears in ever decreasing gear ratios.

An advantage of the bicycle drive system of the present invention is the ability to use the system on a full-suspension bicycle. Many bicycles with rear-suspension produce movement of the rear wheel under compression in relation to the frame's bottom bracket and main frame. Such movement does not affect the bicycle drive system of the present invention because the bearings in the slider frames 3 and 11, which are fixed around both the driving crank spindle 17 and the driven rear hub 13, respectively, act as pivots, complying to any movement. The telescoping link 7,8 is a linear movement bearing made up of an outer and an inner race, which connects the drive shaft 6 and rear shaft/pinion gear 10 and moves during shifting. This movement can compensate for changes in wheel base length during compression of most rear suspension designs.

A thin plastic shell (not shown) can be used to cover each of the slider frames, including all components contained within the slider frames, and the face gears to prevent dirt and obstacles from diminishing performance and to eliminate the need for frequent cleaning service.

An alternative embodiment of the bicycle drive system replaces the cables and intercepting wedges with a servo motor that is coupled to the slider frame. In this alternative embodiment, the servo motor turns a small screw gear to move the guide assembly and the shaft/pinion gear at the aligned adjacent teeth. The servo motor is triggered by the dowel pins. Each dowel pin is associated with a marking or reflective material on the face gear. An optic sensor detects the markings or reflective material. A two-button switch can control the motorized shifter.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A bicycle drive system comprising:
   a. a first face gear wheel including at least two first concentric face gears and a plurality of dowel pins extending from a surface of the first face gear wheel;
   b. a second face gear wheel including at least two second concentric face gears and a plurality of dowel pins extending from a surface of the second face gear wheel;
   c. a variable length drive shaft having an axis of rotation and having a first end and a second end; and
   d. a first gear shift assembly coupled to the first end of the drive shaft and engaging one of the first concentric face gears; and
   e. a second gear shift assembly coupled to the second end of the drive shaft and engaging one of the second concentric face gears, wherein upon initiating of a gear shift both the first gear shift assembly and the second gear shift assembly are simultaneously actuated such that the first gear shift assembly maintains a current position relative to the engaged first concentric face gear and the second gear shift assembly moves to and engages an adjacent second concentric face gear as the second face gear wheel rotates to one of a plurality of alignment positions on the second face gear where gear teeth on an adjacent second concentric face gears are aligned in a radial direction,
   wherein the first face gear includes a plurality of alignment positions such that upon a subsequent gear shift both the first gear shift assembly and the second gear shift assembly are simultaneously actuated such that the second gear shift assembly maintains a current position relative to the engaged second concentric face gear and the first gear shift assembly moves to an adjacent first concentric face gear as the first face gear wheel rotates to one of the plurality of alignment positions on the first face gear where gear teeth on adjacent first concentric face gears are aligned in a radial direction.

2. The bicycle drive system of claim 1, wherein each of the alignment positions enables a continuous transition from one of the second concentric face gears to the adjacent second concentric face gear.

3. The bicycle drive system of claim 1, further comprising a protective cover.

4. The bicycle drive system of claim 1, wherein the variable length drive shaft extends along the axis of rotation of the variable length drive shaft when the first gear shift assembly moves to the adjacent first concentric face gear where the first concentric face gear is positioned radially outward from the current position of the first gear assembly.

5. The bicycle drive system of claim 1, wherein the variable length drive shaft contracts along the axis of rotation of the variable length drive shaft when the first gear shift assembly moves to the adjacent first concentric face gear where the first concentric face gear is positioned radially inward from the current position of the first gear assembly.

6. The bicycle drive system of claim 1, wherein the variable length drive shaft extends along the axis of rotation of the variable length drive shaft when the second gear shift assembly moves to the adjacent second concentric face gear where the second concentric face gear is positioned radially outward from the current position of the second gear assembly.

7. The bicycle drive system of claim 1, wherein the variable length drive shaft contracts along the axis of rotation of the variable length drive shaft when the second gear shift assembly moves to the adjacent second concentric face gear where the second concentric face gear is positioned radially inward from the current position of the second gear assembly.

8. The bicycle drive system of claim 1, wherein the second gear shift assembly includes a second pinion gear coupled to the second end of the drive shaft and in rotatable contact with the engaged one of the second concentric face gears.

9. The bicycle drive system of claim 1, wherein the second pinion gear maintains continuous contact with the second face gear wheel while moving from the current position to the adjacent second concentric face gear.

10. The bicycle drive system of claim 1, further comprising a gear shift controller coupled to the first gear shift assembly and the second gear shift assembly, wherein the gear shift controller comprises a cable assembly.

11. The bicycle drive system of claim 1, further comprising a gear shift controller coupled to the first gear shift assembly and the second gear shift assembly, wherein the gear shift controller comprises a servo assembly.

12. The bicycle drive system of claim 1, wherein the first and second gear shift assemblies each include pinion gears with elliptical barrel-shaped tooth form.

13. The bicycle drive system of claim 1, wherein each concentric face gear includes a face gear tooth form substantially configured according to a zero pressure angle.

14. The bicycle drive system of claim 1, wherein the second face gear wheel is mounted on a rotatable hub of a bicycle frame.

15. The bicycle drive system of claim 14, wherein the first face gear wheel is mounted on a rotatable crank spindle.

16. The bicycle drive system of claim 15, wherein the rotatable crank spindle is coupled to a the bicycle frame such that the bicycle drive system is mounted independent of the bicycle frame.

17. The bicycle drive system of claim 15, further comprising a power input means for rotating the rotatable crank spindle.

18. The bicycle drive system of claim 1, wherein the first gear shift assembly includes a first pinion gear coupled to the first end of the drive shaft and in rotatable contact with the engaged one of the first concentric face gears.

19. The bicycle drive system of claim 18, wherein the first pinion gear maintains continuous contact with the first face gear wheel while moving from the current position to the adjacent first concentric face gear.

20. The bicycle drive system of claim 1, wherein each of the plurality of dowel pins on the first face gear corresponds to one of the alignment positions on the first face gear, and each of the plurality of dowel pins on the second face gear wheel correspond to one of the alignment positions on the second face gear wheel.

21. The bicycle drive system of claim 20, wherein the first gear shift assembly includes a first plurality of wedge guides such that the first plurality of wedge guides are configured in an up position while the first gear assembly maintains the current position, and a portion of the first plurality of wedge guides are configured in a down position while the first gear assembly moves to the adjacent first concentric face gear, wherein the down position is configured to enable the portion of the first plurality of wedge guides to intercept one of the plurality of dowel pins on the first face gear wheel.

22. The bicycle drive system of claim 20, wherein the second gear shift assembly includes a second plurality of wedge guides such that the second plurality of wedge guides are configured in an up position while the second gear assembly maintains the current position, and a portion of the second plurality of wedge guides are configured in a down position while the second gear assembly moves to the adjacent second concentric face gear, wherein the down position is configured to enable the portion of the second plurality of wedge guides to intercept one of the plurality of dowel pins on the second face gear wheel.

23. A bicycle gear shift system comprising:
 a. a face gear wheel including at least two concentric face gears and a plurality of dowel pins extending from a surface of the face gear wheel;
 b. a pinion gear engaging one of the concentric face gears;
 c. a sliding assembly coupled to the pinion gear, the sliding assembly including a plurality of wedge guides; and
 d. means for moving the plurality of wedge guides between a neutral position and a shift position such that in the shift position one of the plurality of wedge guides intercepts one of the plurality of dowel pins thereby moving the sliding assembly and the pinion gear from a first concentric face gear to a second concentric face gear.

24. The bicycle gear shift system of claim 23, wherein each concentric face gear includes a face gear tooth form substantially configured according to a zero pressure angle.

25. The bicycle gear shift system of claim 23, wherein the means for moving comprises a camshaft coupled to the sliding assembly and in moveable contact with a plurality of cam followers coupled to the plurality of wedge guides.

26. The bicycle gear shift system of claim 25, wherein the camshaft is coupled to a cable assembly to turn the camshaft.

27. The bicycle gear shift system of claim 25, wherein the camshaft is coupled to a servo assembly to turn the camshaft.

28. The bicycle gear shift system of claim 23, wherein the plurality of wedge guides includes a first number of wedge guides and a second number of wedge guides such that when the first number of wedge guides intercepts one of the plurality of dowel pins, the sliding assembly and the pinion gear move in an outward radial direction, and when the second number of wedge guides intercepts one of the plurality of dowel pins, the sliding assembly and the pinion gear move in an inward radial direction.

29. The bicycle gear shift system of claim 28, further comprising a trigger to engage the one of the plurality of dowel pins after intercepting the wedge guides in the shift position, thereby moving the plurality of wedge guides to the neutral position.

30. The bicycle gear shift system of claim 23, further comprising a frame to position the pinion gear and sliding assembly.

31. The bicycle gear shift system of claim 30, wherein the sliding assembly further comprises guide wheels to facilitate movement within the frame.

32. The bicycle gear shift system of claim 31, wherein the sliding assembly further comprises a locking mechanism to lock the sliding assembly into one of a plurality of specific positions within the frame.

* * * * *

UNITED STATES PATENT AND TRADEMARK OFFICE
CERTIFICATE OF CORRECTION

PATENT NO. : 7,434,489 B1  Page 1 of 1
APPLICATION NO. : 11/003890
DATED : October 14, 2008
INVENTOR(S) : Peter Scranton It is certified that error appears in the above-identified patent and that said Letters Patent is hereby corrected as shown below:

IN THE CLAIMS
At column 11, line 17, Claim 16, please remove "a" so that the corresponding phrase reads -- coupled to the bicycle frame --.

Signed and Sealed this

Thirtieth Day of December, 2008

JON W. DUDAS
*Director of the United States Patent and Trademark Office*